Nov. 12, 1963     R. C. ZELLER ETAL     3,110,524
CHAINS FOR CRAWLER TRACTORS
Filed June 7, 1962                       2 Sheets-Sheet 1
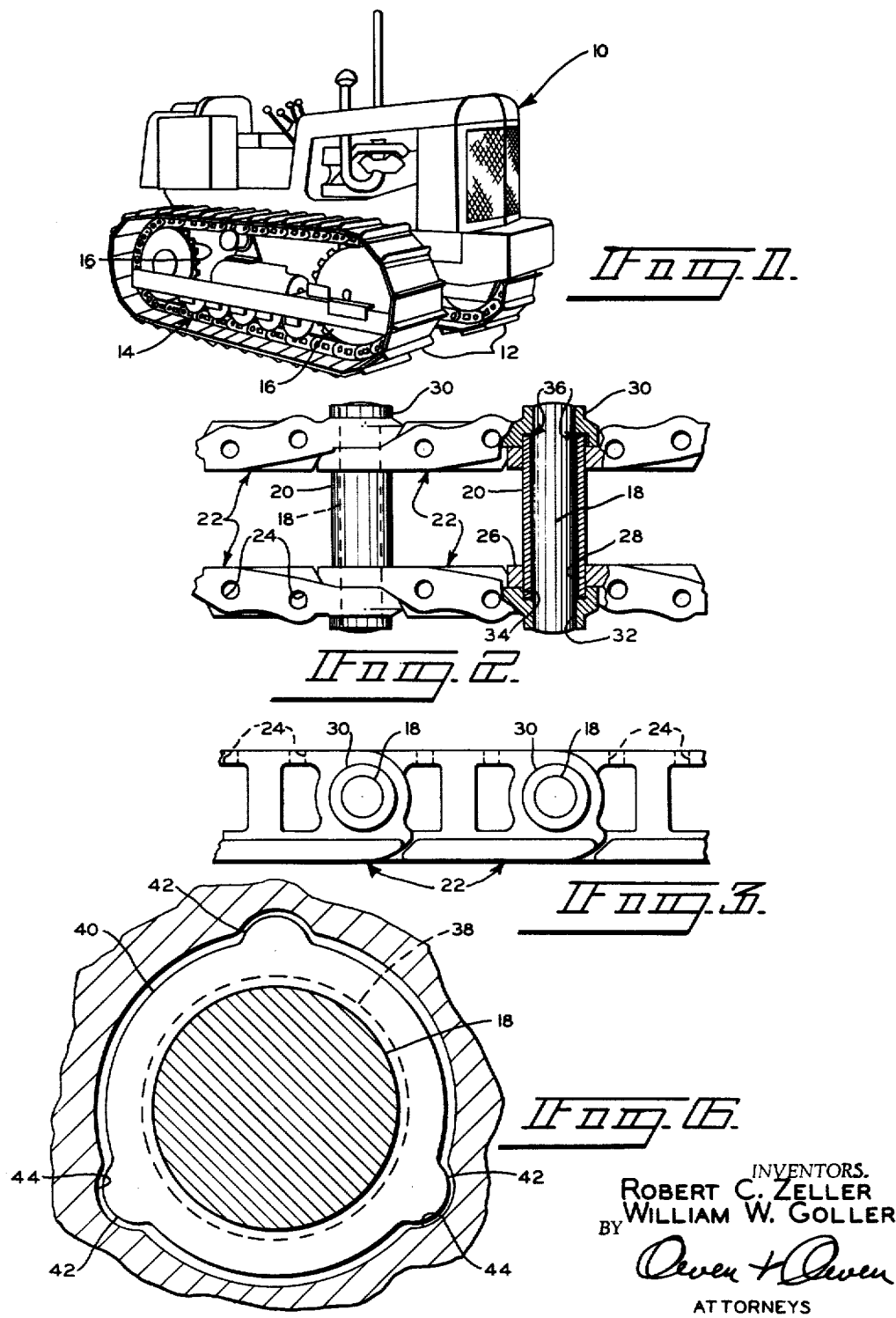
INVENTORS.
ROBERT C. ZELLER
BY WILLIAM W. GOLLER
ATTORNEYS Nov. 12, 1963  R. C. ZELLER ETAL  3,110,524
CHAINS FOR CRAWLER TRACTORS
Filed June 7, 1962  2 Sheets-Sheet 2

INVENTORS.
ROBERT C. ZELLER
WILLIAM W. GOLLER
BY
Owen & Owen
ATTORNEYS

United States Patent Office 3,110,524
Patented Nov. 12, 1963

3,110,524
CHAINS FOR CRAWLER TRACTORS
Robert C. Zeller and William W. Goller, Defiance, Ohio, assignors to The Zeller Corporation, Defiance, Ohio, a corporation of Ohio
Filed June 7, 1962, Ser. No. 200,809
4 Claims. (Cl. 305—11)

This invention relates to chains for crawler tractors and more particularly to such chains having improved sealing means to prevent entry of abrasive material into pivotable portions thereof.

Chains for tractors of the crawler type are attached to the treads of the tractor and in turn engage drive sprockets whereby the treads can be driven. These chains have relatively short lives because they are subjected to heavy loads and stresses and undergo small pivotal movements each time they are engaged by and are carried around a sprocket. While the chains could ordinarily withstand such loads and pivotal movements for considerable periods of time, their lives are shortened substantially because of dirt, sand, and other abrasive materials which work between the pivotal parts of the chains during operation of the tractors, and cause substantial abrasion or wear.

The present invention relates to a chain of improved construction with an improved seal designed to effectively keep abrasive material from entering between pivotal parts of the chain. The new seal includes a combination of a resilient ring and a washer, with the ring being squeezed on one side of the washer to prevent abrasive material from passing on that side of the washer. The other side of the washer contacts and moves relative to a component of the chain with a small amount of wear occurring between and the component to effect sealing cooperation therebetween. The relative motion between the movable chain component and the washer is attained by means holding the washer fixed with respect to another chain component.

It is, therefore, a principal object of the invention to provide an improved chain assembly with an improved seal which more effectively keeps out abrasive materials and increases the life of the chain.

Other objects and advantages of the invention will be apparent from the following detailed description of a preferred embodiment thereof, reference being made to the accompanying drawing, in which:

FIG. 1 is a somewhat schematic view in perspective of a crawler tractor embodying treads and a tread chain according to the invention;

FIG. 2 is a greatly enlarged, plan view of the chain shown in FIG. 1, with parts broken away and with parts in cross section;

FIG. 3 is a view in elevation of the chain shown in FIG. 2;

FIG. 6 is a view in cross section taken along the line 6—6 of FIG. 4.

Figure 4:
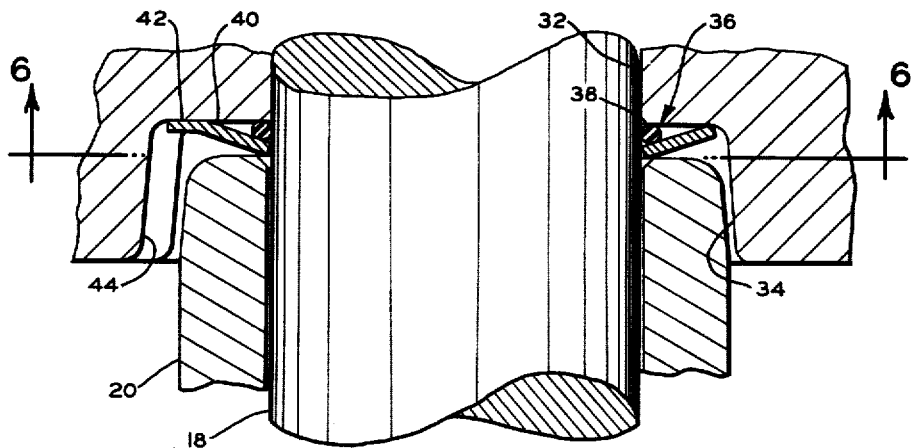
FIG. 4 is a greatly enlarged, fragmentary view of certain chain components and sealing means before being fully assembled.

Referring to the drawing, and more particularly to FIG. 1, a crawler tractor indicated at 10 has two treads 12 which are independently driven to control movement of the tractor 10 in a known manner. A chain indicated at 14 is attached to each of the treads 12 and, in turn, is engaged by drive and idler sprockets 16 which drive the chain 14 and the treads 12 is a known manner. The chain is subjected to large stresses and strains but by making the components of the chain of suitably hardened materials, the life thereof ordinarily could be satisfactorily extended. Because the chains are in the close proximity with the ground, however, dirt, sand, and other abrasive materials work into the chain components and substantially shorten the life of the components, even when made of high quality, hardened steels. Thus, what would otherwise be a satisfactory life for the chain components is greatly shortened because of the abrasive materials, rendering frequent replacement of the expensive chain a necessity.

The chain 14 embodying the principles of the present invention is designed specifically to keep all abrasive materials from between pivotal components of the chain and thereby extend the life of it to a reasonable period of time. Referring more particularly to FIGS. 2 and 3, the chain 14 includes pins 18, around each of which is a cylindrical bushing 20 of somewhat shorter length so that the pin extends outwardly beyond both ends of the bushing 20. A loose fit is provided between the pin 18 and the bushing 20 with the clearance being about 0.015", for example. All of the movement between the chain components, as they pass around the sprockets 16, is taken up by the pins 18 and the bushings 20.

Chain links or side bars 22 of suitable design are provided in left and right hand sets, with each of the links 22 having holes 24 therein to receive fasteners by means of which the treads 12 are attached to the chain 14. An inner or rear end 26 of each of the links 22 has an opening 28 therein, by means of which the link 22 is attached by a press fit to an end portion of one of the bushings 20 so that the link 22 and the bushing 20 are functionally integral. An outer or front end 30 of the link 22 provided with an opening 32 by means of which the end 30 is attached to the pin 18 by a press fit. Thus, each of the links 22 is also functionally integral with one of the pins 18. The outer end 30 of the link 22 also forms an annular recess 34 which fits over an end portion of one of the bushings 20. Because each of the links 22 is functionally integral with one of the pins 18 and with one of the bushings 20, substantially all pivotal movement of the chain components is between the pin 18 and the bushing 20. While the inner end 26 of one of the links 22 moves relative to the outer end 30 of an adjacent one of the links 22, they are not in direct contact.

Figure 5:
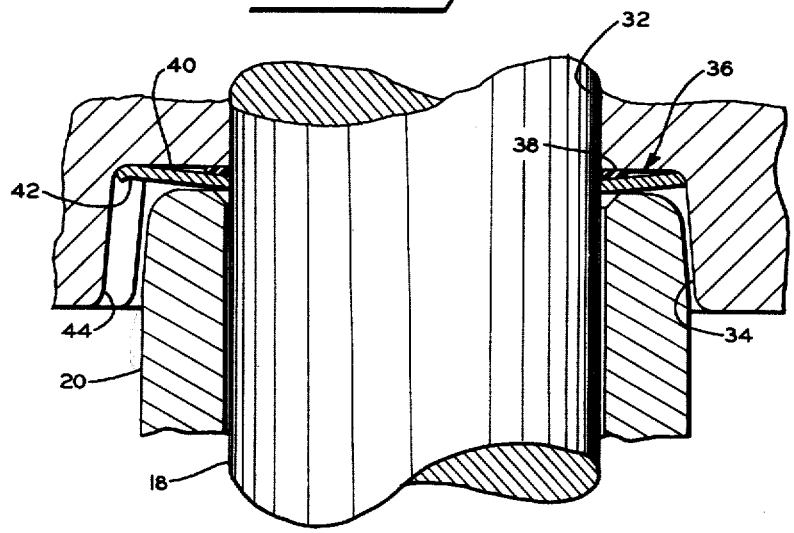
FIG. 5 is a view similar to FIG. 4 but after assembly is completed.

Sealing means indicated at 36 is located between the end of each of the bushings 20 and the recess 34 of the outer end 30 of each of the links 22. While it is not essential that the recess 34 be provided in the end 30 of the link 22, the recess 34, in cooperation with the bushing 20, tends to provide an additional barrier to the passage of abrasive material to the sealing means 36 and also provides some protection for the sealing means. As shown more specifically in FIGS. 4, 5, and 6, the sealing means 36 includes a sealing ring 38 preferably made of a yieldable or resilient material such as rubber so that it can be squeezed and flattened. A dish-shaped washer 40 is located between the resilient ring 38 and the end of the bushing 20, with a concave side of the washer 40 toward the ring 38. An outer edge portion of the washer 40 is in contact with the link 22 while an inner edge portion of the washer 40 is in contact with the end of the bushing 20.

The washer 40 also has projections 42 extending generally radially outwardly from the outer periphery thereof, which projections 42 extend into and cooperate with notches 44 in the recess 34 of the link 22. The purpose of the cooperation between the projections 42 and the notches 44 is to prevent the ring 40 from rotating relative to the end 30 of the link 22. If desired, the notches 44 and the projections 42 could be reversed or other suitable means could be employed to achieve the desired effect.

With relative movement between the washer 40 and the link 22 prevented, the ring 38 cannot be placed in shear or be abraded and it is only subjected to a small variation in the compressive force exerted on it, which variation is due to certain movements, such as turning, of the tractor 10. This does not have any serious effect on the life of the ring 38 nor on the sealing effectiveness.

Because the link 22 pivots through a small angle relative to the bushing 20 as the chain 14 passes around the sprockets 16, relative movement and a small amount of wear does result between the washer 40 and the end of the bushing 20. Therefore, the washer 40 is made slightly thicker than would otherwise be necessary, with a thickness of 0.062" being adequate in most instances to assure that the washer will not wear through during the life of the chain. Although wear between the bushing and the washer is minimized due to hardening of both of them, the slight wear that does occur between them forms minute annular grooves and ridges therebetween which further increases the sealing effect between them. Thus, the flattened washer 38 effectively prevents abrasive material from passing on one side of the washer 40 to the space between the pin 18 and the bushing 20, while the cooperation between the washer 40 and the bushing 20 prevents abrasive material from passing on the other side of it.

It may be noted that the same variation in compressive force that acts on the resilient ring 38 also tends to change the degree of concavity of the washer 40 but, in any event, the concavity of the washer enables the sealing contact of it to be retained. Hence, the sealing contact is maintained, even with slight lateral movement of the chain components, which could not otherwise be achieved with a flat washer. Because of the effectiveness of the sealing means 36, it can also be possible to employ lubricant between the pin 18 and the bushing 20 to add to the life of the chain components.

Various modifications of the above described embodiment of the invention will be apparent to those skilled in the art, and it is to be understood that such modifications can be made without departing from the scope of the invention, if these modifications are within the spirit and tenor of the appended claims.

What we claim is:

1. A chain for the tread of a crawler tractor, said chain including a plurality of pins, a bushing on each of said pins, said bushings being shorter than said pins with the pins extending beyond the ends of the bushings, a plurality of pairs of links, corresponding ends of each pair being attached to spaced end portions of a bushing by a force fit, the opposite ends of each pair being attached to spaced end portions of one of said pins beyond its associated bushing by a force fit, and seals between the ends of each of said bushings and the latter ends of each pair of said links, each seal comprising a flattened resilient ring around the associated pin and adjacent one of the latter ends of said pairs of links, and a dish-shaped washer around the associated pin between an end of the associated bushing and said resilient ring, said washer having a concave surface facing said resilient ring, the outer diameter of said washer exceeding the outer diameter of said resilient ring, an inner edge portion of said washer contacting the end of the associated bushing and an outer edge portion of said washer contacting the end of the associated link around said pin and around said ring, whereby said flattened resilient ring prevents abrasive material from entering between the associated pin and the associated bushing on one side of said washer and the engagement of said washer with the associated bushing end prevents abrasive material from entering on the other side of said washer.

2. A chain according to claim 1 characterized by means on each of said washers cooperating with means on the associated latter end of the associated link to prevent rotation of the washer with respect to the associated link.

3. A chain for the tread of a crawler tractor, said chain comprising a pin, a bushing on said pin, said bushing being shorter than said pin with the pin extending beyond both ends of said bushing, a first link having an end functionally integral with an end portion of said bushing, a second link having an end functionally integral with said pin beyond the end portion of said bushing, and a seal between said bushing and said second link comprising a flattened ring around said pin adjacent the end of said second link, and a dish-shaped washer around said pin between said bushing and said ring, with a concave surface of said washer facing said ring, an inner edge portion of said washer contacting an end of said bushing and an outer edge portion of said washer engaging the end of said second link around said pin to prevent rotational movement of said washer relative to said second link and said flattened ring, whereby said ring prevents abrasive material from passing between said washer and said second link and the contact of said washer with said bushing prevents abrasive material from passing between said washer and said bushing.

4. A chain according to claim 3 wherein the end of said second link is recessed and the end of said bushing extends into said recess.

References Cited in the file of this patent

UNITED STATES PATENTS

| 2,285,870 | Parker | June 9, 1942 |
| 2,699,974 | Deffenbaugh | Jan. 18, 1955 |
| 2,750,215 | Bermingham | June 12, 1956 |
| 3,007,724 | Amirault et al. | Nov. 7, 1961 |
| 3,050,346 | Simpson et al. | Aug. 21, 1962 |

FOREIGN PATENTS

| 118,719 | Australia | July 18, 1944 |

UNITED STATES PATENT OFFICE
CERTIFICATE OF CORRECTION

Patent No. 3,110,524                                November 12, 1963

Robert C. Zeller et al.

It is hereby certified that error appears in the above numbered patent requiring correction and that the said Letters Patent should read as corrected below.

Column 1, lines 34 and 35, after "between" insert -- the washer --; line 70, for "is" read -- in --; column 2, line 33, after "22" insert -- is --.

Signed and sealed this 28th day of April 1964.

(SEAL)
Attest:

ERNEST W. SWIDER                                EDWARD J. BRENNER

Attesting Officer                                      Commissioner of Patents